United States Patent [19]

Yamabe et al.

[11] Patent Number: 4,487,893
[45] Date of Patent: Dec. 11, 1984

[54] PROCESS FOR PRODUCING CARBOXYL GROUP-CONTAINING FLUOROPOLYMER

[75] Inventors: Masaaki Yamabe; Gen Kojima, both of Machida; Katsuyuki Akiyama, Yotsukaidoh, all of Japan

[73] Assignee: Asahi Glass Company Ltd., Tokyo, Japan

[21] Appl. No.: 456,097

[22] Filed: Jan. 6, 1983

[30] Foreign Application Priority Data

Feb. 5, 1982 [JP] Japan .................................. 57-16368

[51] Int. Cl.$^3$ ................................. C08F 8/00
[52] U.S. Cl. ................................. 525/386; 525/326.2
[58] Field of Search .......................................... 525/386

[56] References Cited

U.S. PATENT DOCUMENTS 3,321,429  5/1967  Thormer et al. ................... 525/386
4,015,057  3/1977  Gall ................................. 525/386
4,204,927  5/1980  Carlson ............................ 525/386

FOREIGN PATENT DOCUMENTS 1149940  4/1969  United Kingdom .

Primary Examiner—Joseph L. Schofer
Assistant Examiner—Bernard Lipman

Attorney, Agent, or Firm—Oblon, Fisher, Spivak, McClelland & Maier

[57] ABSTRACT

A process for producing a carboxyl group-containing fluoropolymer comprises reacting a hydroxyl group-containing fluoropolymer in an organic solvent with a dibasic acid anhydride represented by the general formula

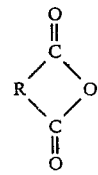

where R represents a bifunctional organic group, to convert at least a part of hydroxyl groups into ester groups represented by the general formula

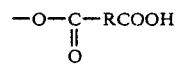

where R is as defined above.

9 Claims, No Drawings

PROCESS FOR PRODUCING CARBOXYL GROUP-CONTAINING FLUOROPOLYMER

The present invention relates to a process for producing a carboxyl group-containing fluoropolymer. More particularly, it relates to a process for producing a carboxyl group-containing fluoropolymer wherein a polymer reaction between hydroxyl group-containing fluoropolymer and a dibasic acid anhydride is utilized.

Heretofore, various attempts have been made to introduce carboxyl-groups into polymers thereby to impart hydrophilicity, to improve adhesiveness, dyability or dispersability, or to introduce cure sites or ion exchange groups. With respect to usual polymers, some of such methods are practically in use on an industrial scale. Such methods for introducing carboxyl groups are generally classified into two groups, i.e. (1) methods in which a comonomer having carboxyl groups or groups convertible into carboxyl groups, such as acrylic acid, methacrylic acid or their esters is copolymerized to directly introduce carboxyl groups and (2) methods in which a polymer reaction is utilized as in the case of the production of carboxymethyl cellulose. With respect to fluoropolymers, there have been many attemps based on the methods (1), but there have been only a few instances where the methods (2) have been used, such as modification of ion exchange membranes (for instance, Japanese Unexamined Patent Publication Nos. 41791/1975, 18605/1981 and 18625/1981).

When the methods (1) are to be employed for the production of carboxyl group-containing fluoropolymers, it is usually necessary to use a very special carboxyl group-containing monomer prepared via complicated process, in terms of the copolymerizability with the fluorine-containing monomer. Otherwise, there have been difficulties such that the polymerization rate is extremely low, only a low molecular weight polymer is obtainable, or the property of the polymer other than those intended to be modified are likely to be sacrificed.

On the other hand, when the methods (2) are to be used, it is expected that the above difficulties inherent to the methods (1) can be eliminated. However, in the conventional instances wherein such methods have been tried on the fluoropolymers, it has been found practically difficult to conduct such methods on an industrial scale. For instance, the above mentioned Japanese Unexamined Patent Publication No. 41791/1975 discloses a method in which a carboxyl group-containing monomer is grafted under electrolytic dissociative radiation. This method involves, in addition to the industrial difficulties in the use of the radiation, a difficulty that the main chain of the polymer undergoes decomposition or a crosslinking reaction is likely to take place concurrently. On the other hand, the method disclosed in the Japanese Patent Publication No. 18605/1981 or No. 181625/1981, has a disadvantage that the process for introducing carboxyl groups requires many steps including saponification of sulfonyl groups in the starting polymer→halogenation→sulfination→reductive carboxylation or saponification→halogenation→thiosulfonation and graft polymerization.

The present inventors have conducted extensively researches to overcome the above difficulties and paid a particular attention to the reactivity of the hydroxyl groups in the hydroxyl groups-containing fluoropolymer. As a result, it has been found that a carboxyl group-containing fluoropolymer can readily be obtained in good yield in a single reaction step by reacting the hydroxyl groups with a dibasic acid anhydride to convert them into carboxyl group-containing ester groups. The present invention has been accomplished on the basis of this discovery.

Thus, the present invention provides a novel process for producing carboxyl group-containing fluoropolymer which comprises reacting a hydroxyl group-containing fluoropolymer in an organic solvent with a dibasic acid anhydride represented by the general formula

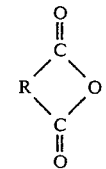

where R represents a bifunctional organic group, to convert at least a part of hydroxyl groups into ester groups represented by the general formula

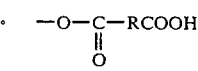

where R is as defined above.

Now, the present invention will be described in further detail.

In the present invention, various hydroxyl group-containing fluoropolymers can be used. For instance, they may be mentioned fluoropolymers to which units derived from hydroxyl group-containing monomers such as hydroxyl vinyl ether, hydroxyl alkyl methacrylate, acryl alcohol or methallyl alcohol are incorporated by addition copolymerization or graft polymerization; fluoropolymers to which units derived from monomers containing certain groups convertible to hydroxyl groups by hydrolysis or alcoholysis such as vinyl carboxylate or allyl carboxylate and in which the convertible groups have been converted to hydroxyl groups; and condensation polymers obtained by the reaction of fluorine-containing polyols with epichlorohydrins.

In view of the reactivity for the introduction of carboxyl groups, such polymers are preferably those which contain primary or secondary hydroxyl groups and those which are soluble in an organic solvent. Further, in view of the availability, addition copolymers obtained by the copolymerization of fluoroolefins with other comonomers such as the above mentioned hydroxyl group-containing monomers or monomers containing certain groups convertible into hydroxyl groups or monomer mixtures containing any other monomers, or their derivatives, are preferred. It is preferred that the number of hydroxyl groups in such polymers is from 1/100 to 1/1, especially from 1/50 to ½, of the number of the units derived from fluoroolefins. As the hydroxyl group-containing monomer, a hydroxylalkyl vinyl ether is preferred in view of its copolymerizability. As the fluoroolefins, there may be mentioned vinyl fluoride, vinylidene fluoride, trifluoroethylene, tetrafluoroethylene, chlorotrifluoroethylene and hexafluoropropene. In view of the copolymerizability, tetrafluoroethylene and chlorotrifluoroethylene are preferred. Further, as the above mentioned other optical comonomers, there may be mentioned α-olefins such as ethylene, propene, isobutylene and butene-1, and vinyl ethers such as ethyl vinyl ester, isobutyl vinyl ether, n-butyl vinyl ether and cyclohexyl vinyl ether. A combination of an alkyl vinyl ether with, if necessary, other optional monomer is preferred.

Typical examples of such preferred copolymers include copolymers containing fluoroolefin, cyclohexyl vinyl ether, an alkyl vinyl ether and a hydroxyvinyl ether as an essential component in amounts of from 40 to 60 molar %, from 5 to 45 molar %, from 5 to 45 molar % and from 3 to 15 molar %, respectively, preferably from 45 to 55 molar %, from 10 to 30 molar %, from 10 to 35 molar % and from 5 to 13 molar %, respectively.

When used as paint vehicles, such copolymers are capable of providing a coating finish having both adequate surface hardness and flexibility, high gloss, solvent resistance, and stain resistance, and distinguished weatherability. Further, by the introduction of carboxyl groups, the compatibility with various additives such as pigments or reinforcing fillers and the adhesiveness to the substrates are improved, and thus they provide fluoropolymers which are very useful as paint vehicles.

As the dibasic acid anhydride in the present invention, there may be used various compounds represented by the general formula

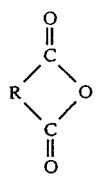

Where R is a bifunctional organic group. Specifically, there may be mentioned succinic anhydride, glutaric anhydride, itaconic anhydride, adipic anhydride, 1,2-cyclohexanoic dicarboxylic acid anhydride, cis-4-cyclohexane-1,2-dicarboxylic acid anhydride, phthalic anhydride, 1,8-naphthalic anhydride and maleic anhydride. In view of the reactivity, non-aromatic carboxylic anhydrides are preferred. Particularly preferred are those in which R is an alkylene group having from 2 to 8 carbon atoms. When reacted with such a dibasic acid anhydride, at least a part of hydroxyl groups in the fluoropolymer is converted to an ester group represented by the general formula

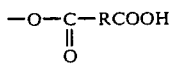

whereby the introduction of carboxyl groups is accomplished.

In the present invention, it is important to carry out the reaction of the above mentioned hydroxyl group-containing fluoropolymer with the dibasic acid anhydride in an organic solvent. The type of the organic solvent is optionally selected taking into accounts the solubility of the fluoropolymer and the dibasic acid anhydride. For the prevention of discoloring the resulting polymer solution and for easy operation, an aromatic compound having a boiling point of at least 100° C. such as toluene or xylene is preferably used.

In the above mentioned reaction for introducing carboxyl groups, it is possible to use a catalyst. As such catalyst, there may be preferably used a base catalyst, for instance, a carboxyl acid metal salt such as sodium acetate, potassium acetate, lead acetate, lead stearate; an alkali metal hydroxide such as sodium hydroxide or potassium hydroxide; an alkali metal carbonate such as sodium carbonate or potassium carbonate; an alkali metal alcoholate such as sodium methylate, sodium ethylate, potassium methylate or potassium ethylate; a quaternary ammonium salt such as trimethyl benzyl ammonium or triethyl benzyl ammonium; a tertiary amine such as pyridine, triethylene diamine or triethyl amine. Particularly preferred is triethyl benzyl ammonium. The reaction for producing carboxyl groups can be facilitated also by an acid catalyst such as sulfuric acid or para-toluene sulfonic acid. However, in such a case, the condensation reaction of the formed carboxyl groups with unreacted hydroxyl groups is also facilitated depending upon the reaction condition and accordingly it is necessary to carefully select the reaction condition.

In the present invention, the molar ratio of the hydroxyl group-containing fluoropolymer to the dibasic acid anhydride for the reaction is optionally selected depending upon the desired modification expected by the introduction of the carboxyl groups. Usually, however, the amount of the dibasic acid anhydride is selected within the range of from 1/200 to 1/1 equivalent, preferably from 1/100 to ½ equivalent based on the hydroxyl group of the fluoropolymer. For instance, when it is intended to impart an autocatalytic function for the curing reaction as pain vehicle and to improve the adhesiveness to the substrate, by the introduction of weakly acidic groups, the amount is preferably within a range from 1/100 to 1/10 equivalent. Likewise, when it is intended to improve the dispersibility of the pigments, the amount is preferably in a range of from 1/40 to 1/5 equivalent.

The reaction temperature for the introduction of the carboxyl groups is preferably selected in the range of from 70° to 150° C., especially from 90° to 130° C. If the temperature is too low, it takes a long period for the reaction. On the other hand, if the temperature is too high, there will be problem that the obtained polymer solution tends to be discolored. The reaction can be completed within a range of from several ten minutes to several hours.

The present invention is widely applicable as a simple and efficient method for producing a carboxyl group-containing fluoropolymer. The present invention is useful not only for the above mentioned improvement of various properties as paint vehicle but also for imparting hydrophilicity or for introducing cure sites or ion exchange groups.

Now, the present invention will be described in further detail with reference to Examples.

EXAMPLE 1

50 g of copolymer containing chlorotrifluoroethylene, cyclohexyl vinyl ether, ethyl vinyl ether and hydroxyvinyl ether in amounts of 50, 15, 25 and 10 molar %, respectively, and having an intrinsic viscosity of 0.20 as measured in tetrahydrofuran at 30° C., was dissolved in 50 g of xylene in a 200 cc four-necked flask equipped with a stirrer, and 0.45 g of succinic anhydride was added. Further, 0.05 g of triethylbenzyl ammonium chloride was added and then the temperature of the flask was gradually raised. After the temperature of the solution of the flask reached 110° C., the reaction was continued at that temperature. A small amount of the solution was sampled every thirty minutes and the progress of the reaction was traced by means of IR spectrum. When the reaction was continued for 2 hours, the characteristic absorption of the succinic anhydride at 1850 cm$^{-1}$ and 1780 cm$^{-1}$ was no longer observed and, instead, strong absorption of a carboxylic acid (1710 cm$^{-1}$) and an ester (1735 cm$^{-1}$) was observed. The reaction solution was rapidly cooled to stop the reaction, and a portion of the solution was sampled for the measurement of the intrinsic viscosity of the formed polymer. The intrinsic viscosity was found to be 0.22. Further, from the analysis of the composition by $^{13}$CNMR, it was found that the hydroxyl groups decreased by about 10%. The hydroxyl value and the carboxyl value of this polymer were 47 and 5.2, respectively.

The obtained polymer containing carboxyl groups and hydroxyl groups exhibited good compatibility with pigments such as titanium dioxide or phthalocyanine blue.

EXAMPLE 2

Into a 2 l four necked flask, 1119 g of the same starting material polymer as used in Example 1 was introduced and dissolved in xylene of the same amount under stirring. To this solution, 21.0 g of succinic anhydride and 1.11 g of triethyl benzyl ammonium chloride were added and then the temperature of the flask was raised to 110° C. and reaction was conducted for 2 hours. After rapidly cooling the reaction solution, the infrared spectrum of the reaction solution was obtained whereby it was found that succinic anhydride was completely reacted and the carboxylation was completed. A portion of the formed polymer was sampled and analyzed, whereby it was found that the polymer had an intrinsic viscosity of 0.30, a hydroxyl value of 41 and a carboxyl value of 10.3.

EXAMPLE 3

The carboxylation was conducted in the same manner as in Example 1 except that the starting polymer had an intrinsic viscosity of 0.47 and the carboxylation was carried out at a temperature of 100° C. After the reaction was continued for 4 hours, it was confirmed that the carboxylation was almost completed, and the reaction solution was rapidly cooled to stop the reaction. The polymer thereby obtained had an intrinsic viscosity of 0.52, a hydroxyl value of 47.5 and a carboxyl value of 4.7.

EXAMPLE 4

Tetrafluoroethylene, ethylene and n-butyl vinyl ester were introduced into a stainless steel autoclave in amounts of 50, 45, and 5 molar %, respectively and then the polymerization was carried out in t-butanol with use of azobisisobutylonitrile at 65° C. for 3 hours. The copolymer thereby obtained was a thermoplastic polymer showing a strong IR absorption at 1760 cm$^{-1}$ due to the ester group. 9.1 g of the powder of this polymer was introduced into 150 g of a mixed solvent composed of xylene, methyl isobutyl ketone, and n-butanol (50/40/10) in a four-necked flask, and permitted to swell under heating and stirring. While maintaining the flask at 100° C., the solution obtained by dissolving 0.2 g of sodium butylate in 5 g of n-butanol was carefully added dropwise. The reaction was continued for 5 hours then the portion of the polymer was precipitated by methanol, washed and dried, and then it was fabricated into a film having a thickness of 45μ by means of a hot press. This film exhibited wide infrared absorption at 3200 to 3600 cm$^{-1}$ due to the hydroxyl group, thus indicating that the ester group was alkolysised and converted into the hydroxyl groups. And, a total amount of the polymer was precipitated by methanol, washed and dried and then it was subjected to swelling in the mixed solvent (100 g) composed of xylene and methylisobutylketone (50/50) under heating. 0.1 g of succinic anhydride was dissolved in 10 g of xylene, and 0.01 g of triethyl benzyl ammonium chloride was added and then the reaction was conducted for 3 hours at a temperature of 110° C.

From the reaction solution, the polymer was precipitated with use of methanol whereupon the infrared spectrum was obtained in the same manner as described above. An increase of the ester bond at 1760 cm$^{-1}$ and absorption of the carboxylic acid 1710 cm$^{-1}$ were observed.

The starting polymer (A), polymer (B) obtained by alcoholysis and the carboxylated polymer (C) were respectively melted by means of an oven at the temperature of 280° C. for 5 minutes to form the coating a thickness of about 20μ on a stainless steel mirror surface. The coatings thereby obtained were subjected to cross-cut adhesion tests whereby it was confirmed that the carboxylated polymer had good adhesiveness with the following results:

polymer (A): 23/100
polymer (B): 55/100
Polymer (C): 100/100.

We claim:

1. A process for producing a carboxyl group-containing fluoropolymer, which comprises:
   reacting a hydroxyl group-containing fluoropolymer obtained by reacting at least one fluoroolefin with a comonomer, said fluoropolymer containing 1/50 to ½ hydroxyl groups to the number of fluoroolefin units, in an aromatic compound having a boiling point of at least 100° C. with a dibasic acid anhydride represented by the formula:

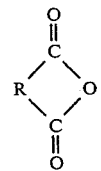

wherein R represents a bifunctional organic group, to convert at least a portion of the hydroxyl groups into ester groups represented by the formula:

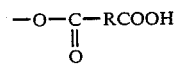

wherein R is as defined above.

2. The process according to claim 1 wherein said comonomer is an alkyl vinyl ether.

3. The process according to claim 1 wherein the fluoroolefin is selected from the group conisting of tetrafluoroethylene and chlorotrifluoroethylene.

4. The process according to claim 1, wherein the hydroxyl groups in said fluoropolymer are provided by said comonomer which is a hydroxyl group-containing unsaturated compound.

5. The process according to claim 4 wherein the hydroxyl group-containing unsaturated compound is a hydroxyalkyl vinyl ether.

6. The process according to claim 1 wherein R of the dibasic acid anhydride is an alkylene group having from 2 to 8 carbon atoms.

7. The process according to claim 1 wherein the dibasic acid anhydride is reacted in the presence of a basic catalyst.

8. The process according to claim 1 wherein the conversion from the hydroxyl groups to ester groups is from 1 to 50%.

9. The process according to claim 1 wherein the hydroxyl groups are primary or secondary hydroxyl groups.

* * * * *